INVENTORS
FRANK J. THOMAS
ROBERT L. WORTHINGTON
ATTORNEY

INVENTORS
FRANK J. THOMAS
ROBERT L. WORTHINGTON
ATTORNEY

United States Patent Office 3,431,557
Patented Mar. 4, 1969

3,431,557
MONITORING SYSTEM FOR
REDUNDANT SYSTEMS
Frank J. Thomas, West Paterson, and Robert L. Worthington, Wayne, N.J., assignors to The Bendix Corporation, Teterboro, N.J., a corporation of Delaware
Filed Mar. 12, 1964, Ser. No. 351,426
U.S. Cl. 340—147     10 Claims
Int. Cl. H04q 1/20, 1/22; G08b 21/00

ABSTRACT OF THE DISCLOSURE

A monitoring system for redundant systems whereby the presence of a failure in the redundant system causes an indicator lamp to light and to remain lit even though the switching over to the back-up redundant system has removed the presence of the failure signal. The failure indicating lamp would remain lit until maintenance technicians have manually turned off the failure indicating lamp.

---

This invention relates to improvements in a monitoring system for use in redundant systems of a type disclosed and claimed in a copending U.S. application Ser. No. 314,397, now Patent No. 3,305,735 filed Oct. 7, 1963, by Harold Moreines, and in a U.S. application Ser. No. 318,050, filed Oct. 22, 1963, now Patent No. 3,289,193 by Robert L. Worthington and Frank J. Thomas, both of which applications have been assigned to The Bendix Corporation, assignee of the present invention. More particularly the present invention relates to improvements in an off-line monitor system including a fail-operative voltage comparator.

The need for ultra-reliable automatic flight control systems for high performance aircraft has in turn given rise to the need for a full-operative system during critical flight conditions. In many cases, the fail-operative requirement becomes the overriding consideration in critical subsystems such as stability augmentation. Because of the redundancy and increased system complexity, an object of the invention is to provide equipment to facilitate failure detection, display and fault isolation, and to maintain simplicity in circuit design in order to minimize power dissipation, weight, volume and cost.

An object of the invention is to provide in a redundancy system, a novel monitoring means for effecting fail-operative performance. In such system, there may be provided a voter-monitor concept including a voter on the line which continuously selects and transmits a signal having an intermediate amplitude among three input signals, i.e., it ignores hardovers, null failures, degraded signals, etc. This is accomplished by a simple and reliable electronic circuit with no switching of signals or interruption of the signal chain.

Another object of the invention is to provide a novel monitoring means on an off-line basis and having an operative logic to determine malfunctions. This is accomplished in a manner which in no way interferes with or interrupts the channel signal chain and, in fact, the monitor malfunction indication may be adjusted to any level of signal degradation as determined by system performance requirements. This assures that, in the event of minor changes in component characteristics, nuisance disconnects or warnings will not occur, even though the signal is in fact being rejected by the voter circuit. However, should this degradation continue either on a long term or short term basis, the monitor circuit will indicate the presence of a malfunction when the degradation exceeds desired levels.

The three axes (roll, pitch and yaw) of a typical automatic aircraft flight control system would have to be completely separated or isolated in order to prevent failures in one axis from affecting any of the other control axes. This would give rise to the need of separate electrical power in each axis control system. In addition, the multiple failure requirement necessitates that within each axis (roll, pitch, or yaw), the power supplies are triplicated to maintain independency of failure modes of the three channels of the axis. Such power supply redundancy systems may be of the type disclosed and claimed in the copending U.S. application Ser. No. 314,397, and in the copending U.S. application Ser. No. 318,050.

As explained in these copending applications there may be provided a series-parallel element triple redundant configuration utilizing on-line voters and off-line monitors wherein true signals are reconstituted following each voter. Due to the reconstitution of true signals following each voting process, redundant channel tolerance build-ups are minimized, allowing more precise monitoring thresholds to be maintained. In order to minimize switching transients, the voter may be a series element in the signal chain, or on line. The monitors, however, are off-line to minimize the possibility of a monitor failure causing a malfunction of the control channel.

The electronic circuits to implement the triple redundant system may include a voter circuit, an off-line monitor and a logic-light driver circuit in addition to the necessary circuits to perform the required functions of data shaping and amplification.

Another object of the invention is to provide a novel monitor system to compare the triple redundancy signals, two by two and generate an output whenever the difference between any two input signals exceeds a predetermined threshold level, as upon a signal failure (null, hardover, out of phase) and including difference amplifiers so arranged as to generate signals which will fire respective dualized Schmitt triggers in which binary outputs from the Schmitt triggers are applied to a single-failure light driver circuitry to effectively energize a light for any single failure condition, and including means effective in the event a second failure condition should occur to provide an indication of this second failure.

Another object of the invention is to provide in such a monitor system a Schmitt trigger circuitry such that any input signal to the circuit of an amplitude to fire it, causes it to latch into a new binary state to effectively control a first and a second failure light driver circuitry upon a single and a second failure.

Another object of the invention is to provide an off-line monitor including three identical channels, each channel including a difference amplifier and a dualized Schmitt trigger, together with a novel coupling network between the amplifier and Schmitt trigger so arranged as to render the monitor completely fail-operative, i.e. a failure to any component of the amplifier in any failure mode will result in the Schmitt trigger circuitry effecting an alarm.

Another object of the invention is to provide a Schmitt trigger of a latching type so as to provide the monitor with memory.

Another object of the invention is to provide an off-line monitor in which a fail-operative feature may be realized by utilizing the symmetry of the difference amplifier and the two triggering inputs of a series type Schmitt trigger so that the symmetry and balance of the difference amplifier provides a double-ended output in which failure of any component in the difference amplifier will either increase the sensitivity or cause a D.C. quiescent level at the amplifier to change so that a failure causing a decrease in a D.C. biasing voltage will forward bias a control diode in the coupling network to effect a firing of the Schmitt trigger, while a failure causing an increase in a D.C. biasing voltage will cause a control Zener diode in the coupling network to breakdown or avalanche to effect the firing of the Schmitt trigger.

Another object of the invention is to provide an off-line monitor to detect power supply failures in which each channel of the monitor is excited from a separate power supply and so arranged that a failure to a single power supply will result in a single-failure indication, while a second power supply failure will cause a second failure indication to be generated.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 1:
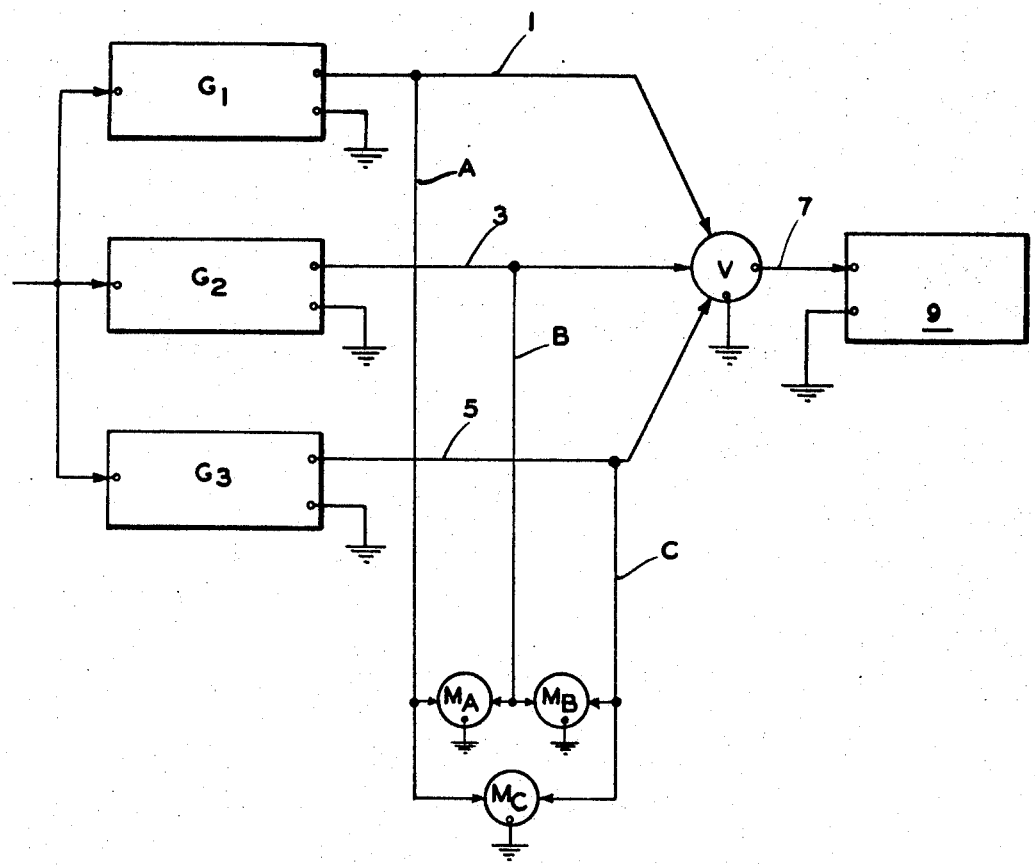
FIGURE 1 is a block diagram of a crosschannel monitoring system in which the improvements of the present invention may be applied.

Referring to the drawing of FIGURE 1 a crosschannel monitoring system embodies redundant equipment $G_1$, $G_2$, and $G_3$ having output lines 1, 3, and 5 operatively connected to a voter device V which may be of a type disclosed and claimed in copending U.S. application Ser. No. 314,397, filed Oct. 7, 1963, and assigned to The Bendix Corporation, assignee of the present invention. The voter device V may have a main output line 7 connected to suitable equipment operated thereby and indicated by the numeral 9.

Figure 2:
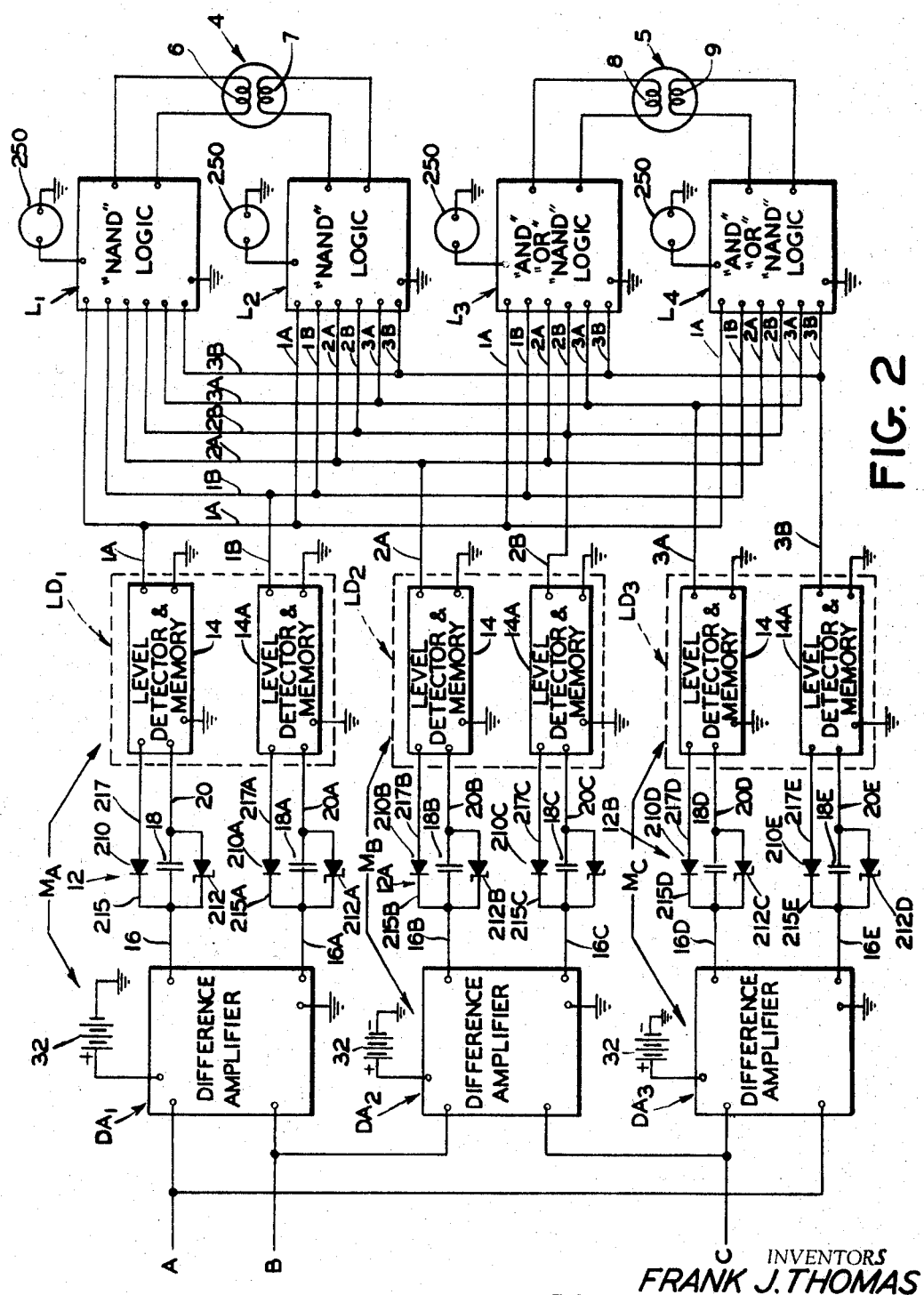
FIGURE 2 is a block diagram illustrating the off-line monitoring system embodying the present invention and including a difference amplifier, a novel coupling network and a level detector including a memory circuit, together with a logic and drive circuitry for operating first and second failure indicator lights.
Figure 4:
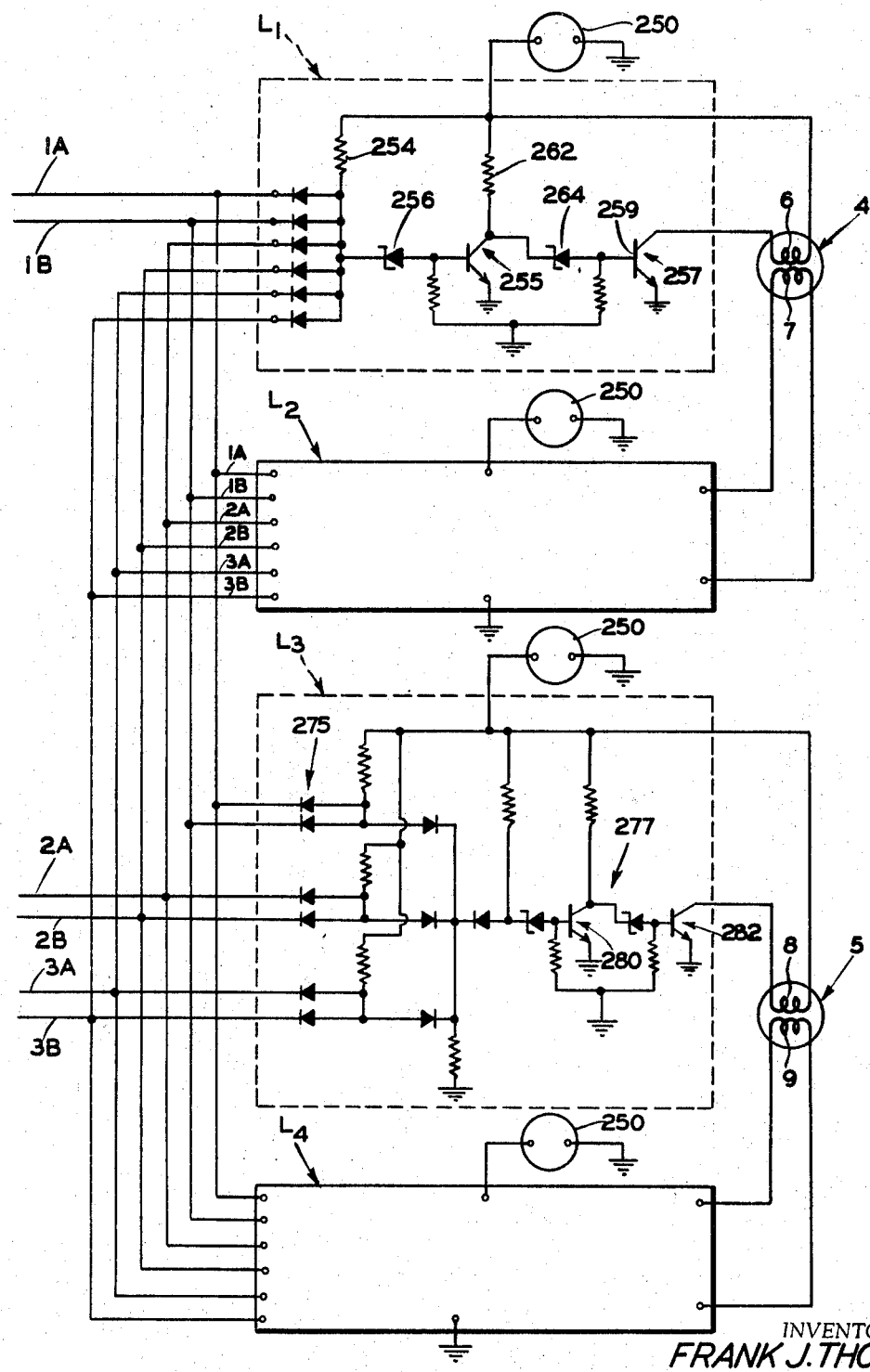
FIGURE 4 is a schematic wiring diagram of the first and second failure light circuitry which may be embodied in the invention.

The off-line monitor shown by block diagram in FIGURE 2 is operatively connected across output lines 1, 3, and 5 of FIGURE 1 by conductors A, B, and C, as shown in FIGURES 1 and 4. In the crosschannel monitor of FIGURE 1, the three channels are compared differentially two by two to provide redundant data failure, since two of the three comparators MA, MB, and MC register each failure. The comparators MA, MB, and MC may be of the type disclosed and claimed broadly in the copending U.S. application Ser. No. 318,050, filed Oct. 22, 1963, by Robert L. Worthington and Frank J. Thomas, and assigned to The Bendix Corporation, assignee of the present invention. Thus, in the arrangement of the off-line monitor system of FIGURE 1 in the event of a single passive monitor failure, the monitor retains its capability to indicate subsequent system failure.

Referring to the block diagram in FIGURE 2, the off-line monitor for the triple redundant system of FIGURE 1 includes three identical channels plus two redundant logic elements which control the warning and pilot action lights upon first and second failure operating conditions. Each channel includes a difference amplifier $DA_1$, $DA_2$, and $DA_3$ and a level detector and memory unit $LD_1$, $LD_2$, and $LD_3$.

In the present invention a first failure indicator light 4 having filaments 6 and 7 is arranged to be energized whenever a single failure occurs and the pilot action light 5 having filaments 8 and 9 is arranged to be energized whenever a second failure occurs. The control of the energization of the indicator lights 4 and 5 is obtained by comparing the three signals A, B, and C two by two and applying the outputs generated as a result of these comparisons to the logic elements.

If the signals A, B, and C are applied to the input of the off-line monitors, MA, MB, and MC and signal A fails due to an open, short, or should the signals be out of tolerance, the difference amplifier $DA_1$ and difference amplifier $DA_3$ will have two different signals at their inputs resulting in a change of state in the level detector and memory units $LD_1$ and $LD_3$. Inasmuch as the "NAND" logic of the logic and driver circuitry of FIGURES 2 and 4 is satisfied whenever a memory unit changes state, the warning light 4 will then be energized upon such failure. The "OR" and "NAND" logic of the logic and driver circuitry $L_3$ and $L_4$ is not satisfied until all three memory units $LD_1$, $LD_2$, and $LD_3$ have changed state so that the second failure or pilot action light 5 will not be energized until there is another or second failure.

Figure 3:
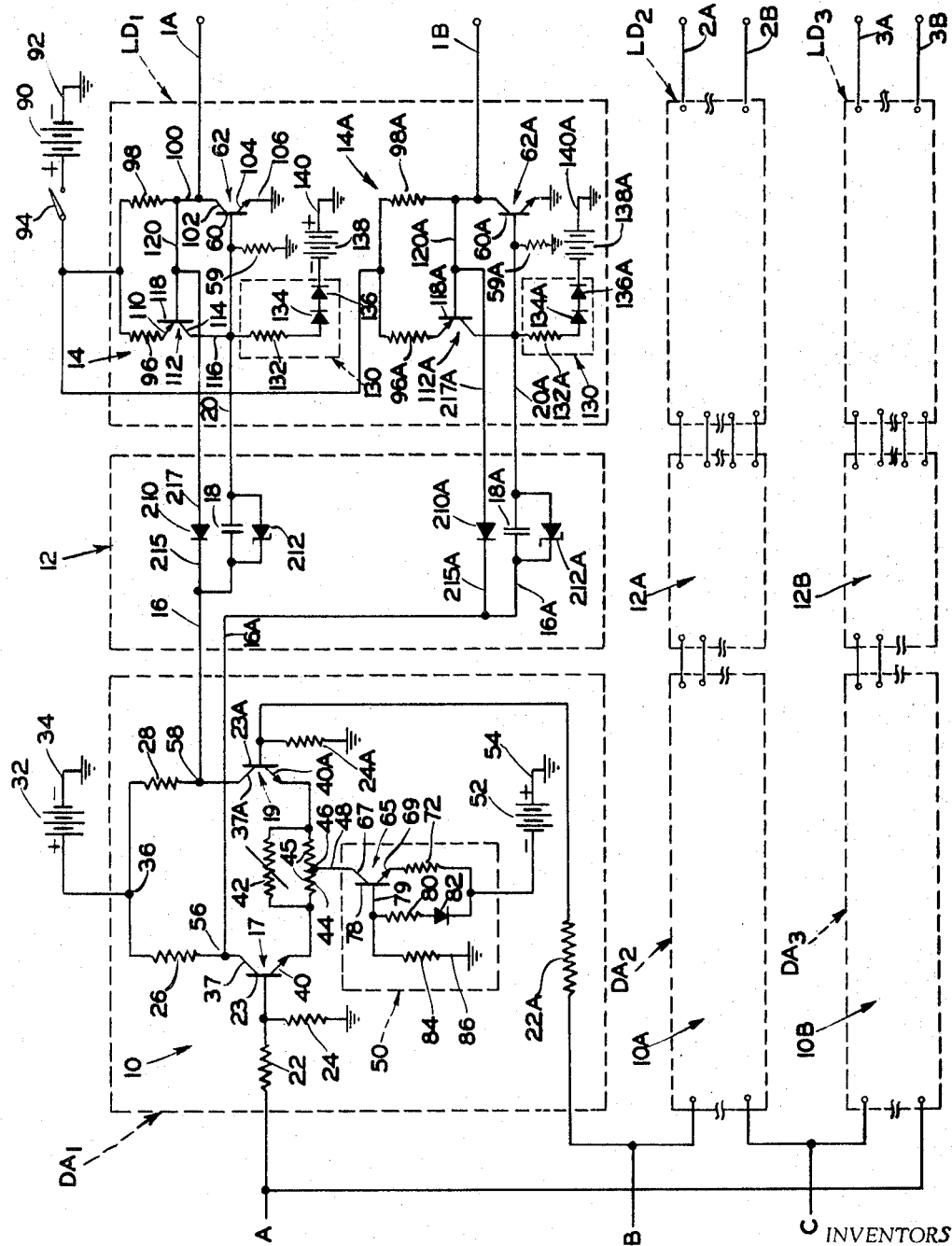
FIGURE 3 is a schematic wiring diagram of the difference amplifier, coupling network, and series connected Schmitt trigger level detector and memory circuitry.

Referring to the drawing of FIGURE 3, the difference amplifier DA embodied in the invention is shown as including a single ended difference amplifier 10 coupled by a novel coupling network 12 to a level detector and memory circuit LD including dualized series type self-latching Schmitt trigger circuits 14 and 14A.

The difference amplifiers $DA_1$, $DA_2$ and $DA_3$ may be of identical construction, and the difference amplifier 10 of the unit $DA_1$ provides an output proportional to the difference between the two alternating current input signals applied at lines A and B while the unit $DA_2$ provides an output proportional to the difference between the two alternating current input signals applied at lines B and C, and the unit $DA_3$ provides an output proportional to the difference between the two alternating current input signals applied at lines A and C. The coupling network 12 normally couples one output from the difference amplifier $DA_1$ applied through a line 16 and a coupling capacitor 18 to a line 20 leading to the input of the series type self-latching Schmitt trigger 14, as shown in FIGURE 3. Another output line 16A from the difference amplifier $DA_1$ is normally coupled through a coupling capacitor 18a to an input line 20A leading to a second series type Schmitt trigger 14a of identical construction to the Schmitt trigger 14.

Upon the alternating current output difference signals from the difference amplifier 10 exceeding a predetermined threshold value due to a failure on the line A or B, there is effected a signal which causes the series type Schmitt triggers 14 or 14A to fire producing a change in the state of the output applied at lines 1A or 1B to effect the operation of the "NAND" gate logic circuitry $L_1$ and $L_2$, shown in FIGURE 4, to effect energization of the filaments 6 and 7 of the first failure indicator light 4.

In the operation of the difference amplifier 10 shown in FIGURE 3, the two signals A and B to be compared are applied to the bases 23 and 23A of the difference amplifier transistors 17 and 19 through voltage divider resistors 22–24 and 22A–24A.

The transistors 17 and 19 form opposite arms of a balanced bridge circuit including resistors 26 and 28 as the other arms thereof. A source of electrical energy or battery 32 has a positive terminal connected at a point 36 intermediate the resistors 26 and 28 and a negative terminal grounded at 34.

The transistor 17 has a collector element 37 and an emitter element 40 controlled by the base element 23 with the collector element 37 connected to the resistor 26 and the emitter element 40 connected to one end of a variable resistor element 42, while the transistor 19 has a collector element 37A and an emitter element 40A controlled by the base element 23A with the collector element 37A being connected to the resistor 28 and the emitter element 40A being connected to the other end of the variable resistor 42. Shunted across the variable resistor element 42 are resistor elements 44 and 45 having a center tap 46 connected by a conductor 48 leading through a temperature responsive constant current regulator 50 to a negative terminal of a source of electrical energy or battery 52 in which the positive terminal is grounded at 54.

The output conductor 16A leads from a point 56 intermediate the resistor 26 and the collector element 37 while the output conductor 16 leads from a point 58 intermediate the resistor 28 and the collector element 37a. The variable resistor 42 is provided for adjusting the gain level of the difference amplifier 10.

The arrangement is such that upon the alternating current signal applied through the line A and the alternating current signal applied through the line B being in phase and of equal amplitude, there will be no alternating current difference signal applied through the output lines 16 and 16A since the potential applied to the emitter elements 40 and 40A connected through the resistors 42, 44, and 45 will be the same so that there will be no difference in such A.C. signals or amplification thereof at the collector elements 37 and 37A.

However, upon the alternating current signals applied at the lines A and B being out of phase or of a different amplitude, such alternating current signals applied through the voltage divider resistors 22–24 and 22A–24A will cause a difference in the potential applied to the bases 23 and 23A and thereby to the emitter elements 40 and 40A so as to cause the difference in the alternating current signals to be amplified at the collector elements 37 and 37A, respectively, and applied through the output lines 16 and 16A and coupling capacitors 18 and 18A, to the input lines 20 and 20A of the Schmitt triggers 14 and 14A and through a voltage dividing resistor 59 and 59A to a suitable ground connection. The voltage drop across the resistors 59 and 59A from the alternating current difference signals applied through the line 20 will be applied to bases 60 and 60A of the Schmitt trigger transistors 62 and 62A of the dualized type Schmitt triggers 14 and 14A, as hereinafter explained.

The temperature compensated constant current regulator 50 includes a transistor 65 having a collector element 67 connected to the lead 48 from the difference amplifier 10 and further has an emitter element 69 connected through a resistor 72 to the negative terminal of the source of electrical energy or battery 52 which has the positive terminal thereof grounded at 54.

The transistor 65 has a controlling base element 78 which is connected by a conductor 79, resistor 80 and diode 82 to the negative terminal of the battery 52.

Shunting the resistor 80, diode 82, and battery 52 is a resistor 84 which is connected at one end to ground at 86 and at the opposite end to the conductor 79 leading to the base element 78. The diode element 82 is formed of a suitable material responsive to changes in the ambient temperature so as to vary the current flow through the voltage divider resistors 80 and 84 to vary the controlling effect of the voltage drop on the base element 78 of transistor 65 so as to maintain a constant flow of current to the battery 52 from the center tap 46 with variance in the environmental temperature.

From the foregoing, it will be seen that the difference amplifier 10 operates to provide output signals through the output conductors 16 and 16A proportional to the difference between the alternating current signals applied through the conductors A and B to the bases 23 and 23A of the transistors 17 and 19 and serves to monitor the phase as well as the amplitude of such signals.

The difference between the alternating current signals thus applied through the lines A and B and amplified at the collector 37 of the transistor 17 and the collector 37A of the transistor 19 is normally coupled by the coupling network 12 to the input lines 20 and 20A of the series type Schmitt trigger circuitry 14 and 14A, where such signals are applied, respectively, to the base 60 of transistor 62 and base 60A of transistor 62A.

When these alternating current difference signals reach a predetermined set value sufficient to cause the transistor 62 and the transistor 62A to start conducting, there is then effected a flow of current from a battery 90 having its negative terminal grounded at 92 and its positive terminal connected by switch 94 to resistors 96 and 98.

The resistor 98 is in turn connected by a conductor 100 to collector element 102 of a transistor 62 having an emitter element 104 connected to ground at 106. The other resistor element 96 is in turn connected to an emitter element 110 of a second transistor 112 of the dual Schmitt trigger circuit having collector element 114 connected by a conductor 116 to the input conductor 20 leading to the base 60 of the transistor 62. The transistor 112 has a base 118 connected by a conductor 120 to the conductor 100.

Further, there is provided a temperature responsive current regulator 130 including a resistor 132 connected at one end to the input conductor 20 and at the opposite end through diode elements 134 and 136 to the negative terminal of a battery 138 having the positive terminal thereof grounded at 140. The diode elements 134 and 136 are formed of a suitable material responsive to changes in the ambient temperatures so as to maintain a constant flow of biasing current through the voltage divider resistor 59 with changes in the environmental temperature.

The arrangement of the dualized series type Schmitt trigger 14 is such then that upon current starting to flow from the battery 90 through resistor 98, and transistor 62, the voltage drop across the resistor 98 is applied to the base 118 of the transistor 112 thereupon causing the transistor 112 to fire permitting in turn the passage of current through the resistor 96, emitter 110, collector 114 and through conductor 116 and resistor 59 to ground whereupon the voltage drop across the resistor 59 applied to the base 60 of the transistor 62 effects a regenerative action causing the transistor 62 to completely fire and latching the series type Schmitt trigger circuitry 14 in a firing latched condition. An output line 1A leads from the conductor 100 to the logic and driver circuitry $L_1$ shown diagrammatically in FIGURE 2 and in circuit detail in FIGURE 4. The circuitry of the Schmitt trigger 14A is identical in operation to that described with reference to the Schmitt trigger circuit 14 and corresponding parts have been indicated by like numerals to which there has been affixed thereto the letter A. It is not considered necessary to restate the operation thereof.

The action then of the series type Schmitt trigger 14 is such as to continue with the transistors 62 and 112 in the firing or latched condition until the opening of the switch 94 serves to interrupt the connection of the battery 90 so that the Schmitt trigger 14 may be reset to a normal nonfiring condition after the firing action has been affected, The closing of the interrupter switch 94 after the resetting action will place the series type Schmitt trigger circuit 14 in the normal operating condition once again.

Logic and driver circuitry

The output line 1A of the Schmitt trigger 14 is connected to the input line 1A leading to the input of the "NAND" logic circuits $L_1$ and $L_2$ and the input of the "AND" logic circuits $L_3$ and $L_4$, as shown schematically in FIGURES 2 and 4. When an input to the Schmitt trigger circuit 14 is below the trigger point, collector 102 of transistor 62 is at the binary 1 level. However, when the input to the Schmitt trigger 14 is increased beyond the triggering point of the Schmitt trigger 14, the Schmitt trigger 14 changes state causing the collector 102 of transistor 62 to go to the binary 0 level. Once the Schmitt trigger 62 is triggered even though the input is reduced below the triggering point, the circuit remains in the triggered state due to the regenerative action of the transistor 112 and remains latched until it is reset by the opening and closing of the reset switch 94 after the firing of the Schmitt trigger 62 to effect the resetting action.

Referring to FIGURE 4, a multiple input "NAND" gate $L_1$ may be used to provide the logic control for the warning light 4. When the input signals to the system of the "NAND" gate logic circuits L₁ and L₂ are in tolerance, the inputs 1A, 1B, 2A, 2B, 3A, and 3B are at the binary 1 level, and the transistor 255 of the "NAND" gate L₁ is saturated through a Zener diode 256 and resistor 254.

Once transistor 255 is saturated, there is no base drive to the transistor 257; therefore, the warning light 4 remains off, but when an out of tolerance signal is detected, transistor 62 changes from a binary 1 level and collector 102 goes to the binary 0 level, two of the inputs 1A–1B, 2A–2B, or 3A–3B to the "NAND" gates L₁ and L₂ change to the binary 0 level whereupon transistor 255 is cut off and a drive to the base 259 of the transistor 257 is provided through resistor 262 and Zener diode 264 to turn transistor 257 on in the "NAND" gates L₁ and L₂ and thereupon effecting energization of the filaments 6 and 7, respectively, of the first failure light 4 upon the first failure.

Referring to FIGURE 4, the logic for the pilot action light 5 is provided by a series combination of an "AND" and "OR" gate 275 and a "NAND" gate 277. Initially, all inputs 1A, 1B; 2A, 2B; 3A, 3B to the "OR" gate 275 are of the binary 1 level. Transistor 280 is saturated, and transistor 282 is cut off. If a single failure occurs, two inputs to the "OR" gate 275 change state, but since the remaining inputs to the "OR" gates 275 are still present, the "NAND" gate 277 remains qualified and transistors 280 and 282 do not change state. However, when a second failure occurs, the remaining inputs to the "OR" gate 275 also change causing the input to the "NAND" gate 275 to change and transistor 280 to cut off and transistor 282 to saturate energizing the respective filaments 8 and 9 of the pilot action light 5.

The logic circuitry of the "NAND" gate L₁, as well as the logic circuitry of the "NAND" gate L₂ has been made redundant by providing a like "NAND" gate L₂ while the logic circuitry of the "AND," "OR," and "NAND" gate L₃ has also been made redundant by providing a like "AND," "OR," and "NAND" gate L₄ so as to thereby insure against failures in the logic circuitry in which corresponding parts are provided so that one of the filaments 6 or 7 of the first failure indicator light 4 and one of the filaments 8 or 9 of the second failure indicator light 5 will be energized, as the case may be, upon a failure in one or the other of the logic circuitry L₁ and L₂ or L₃ and L₄.

The logic and driver circuits for controlling the first and second lights 4 and 5 are shown in FIGURE 4. The first failure light 4 indication is obtained when a single failure occurs. A second failure indication is obtained when two signals of a triple redundant element have failed. In this case all three outputs of the monitors MA, MB, and MC will be negated. To provide fail-operative indications, the logic, driver circuits, and lamps are dual redundant, and excited directly from Ship's primary power, indicated by the numeral 250.

It will be seen then that the system, as shown in FIGURES 1 and 2, includes a differential amplifier DA₁, DA₂, and DA₃ and a dualized Schmitt trigger LD₁, LD₂, and LD₃. The two signals to be compared are applied to the inputs of the difference amplifier, and the difference between these signals is amplified and coupled to the Schmitt trigger. When the difference between the input signals exceeds a threshold value, sufficient gain is generated by the difference amplifier to fire the Schmitt triggers 14 and 14A. The Schmitt triggers are self-latching, i.e. once fired, they remain fired until reset. The resetting is accomplished by disrupting the voltage from the battery 90 by opening the switch 94 and then closing the same. The comparator is also capable of detecting a loss of either the plus or minus supply voltages 32 and 52.

*Fail operative comparator coupling network*

A feature of the present invention over that disclosed in the somewhat similar circuitry of the copending U.S. application Ser. No. 318,050, filed Oct. 22, 1963, by Robert L. Worthington and Frank J. Thomas, the inventors of the present invention, resides in the provision of a unique coupling arrangement 12 for coupling the different amplifier 10 and the Schmitt triggers 14. The normal coupling path is through the capacitors 18 and 18A and corresponding capacitors in the coupling network 12A and 12B of the corresponding comparators MB and MC, as shown in FIGURE 2. In the novel coupling network 12, there are provided diodes 210 and 210A and the Zener diodes 212 and 212A, which provide a coupling to the Schmitt trigger 14 and 14A for a majority of the failures of components in the difference amplifier 10. Corresponding parts are indicated by like numerals for the coupling networks 12A and 12B.

The diode 210, as shown in FIGURE 3, is connected by a conductor 215 to conductor 16 and by the conductor 217 to conductor 120 and is normally back biased by the source of electrical energy 32 which provides a positive supply voltage through resistor 28 to conductors 16 and 215 while the Zener diode 212 shunting the capacitor 18 is normally biased below its avalanche region by the voltage applied through conductor 16 by the positive supply voltage 32.

The arrangement of the diodes 210 and 210A are such that a failure (an opening or shorting) of certain of the component parts of the difference amplifier 10 causes the diode 210 or 210A to be forward biased and fire the transistors 112 and 112A of the Schmitt triggers 14 and 14A, as hereinafter explained.

On the other hand, a failure (an opening or shorting) of certain other of the component parts of the difference amplifier 10 will cause the Zener diode 212 or 212A to be so biased as to avalanche and acting through conductor 20 or 20A on the base 60 or 60A, as the case may be, so as to cause transistor 62 or 62A to start to fire and thereby trigger the latching action and change of state of the Schmitt triggers 14 or 14A.

Thus, an opening of resistor 28 will cause the constant current source 50 or 52 to draw current from the positive terminal of the battery 90 through switch 94, resistors 98, conductors 120 and 217, diode 210, conductors 215 and 16, transistor 19, resistor 45, and conductor 48 leading to the constant current regulator 50. Such action will also cause a change in the voltage acting on the base 118 of the transistor 112 so as to trigger the latching action and change of state of the Schmitt trigger 14.

On the other hand, an opening of the resistor 26 will effect a similar action on the Schmitt trigger 14A in that the opening in resistor 26 will cause the constant current source 50–52 to draw current from the positive terminal of the battery 90 through the switch 94, resistor 98A, conductors 120A and 217A, diode 210A, conductors 215A and 16A, transistor 17, resistor 44 and conductor 48 leading to the constant current regulator 50. The latter action will cause a change in the voltage acting on the base 118A of the transistor 112A to trigger the latching action and change of state of the Schmitt trigger 14A.

If the transistor 19 should short, the back bias applied by the voltage from the positive terminal of the battery 32 through resistor 28 and conductor 16 on the diode 210 will be withdrawn causing current to be diverted from the positive terminal of the battery 90 throuugh resistor 98, conductor 120, diode 210, conductor 16 and the shorted transistor 19 to conductor 48 and effecting a change in the volume acting on the base 118 of the transistor 112 so as to trigger the latching action and change of state of the Schmitt trigger 14.

Likewise, upon the transistor 17 being shorted, the back bias supplied by the battery 32 through the resistor 26 and conductor 16A on the diode 210A will be withdrawn causing current to be diverted from the positive terminal of the battery 90 through resistor 98A, resistor 120A, diode 210A, conductor 16A and the shorted transistor 17 to effect a change on the voltage applied to the base 118A of the transistor 112A so as to trigger the latching action and change of state of the Schmitt trigger 14A.

Now, if the resistor 80 or the temperature compensative diode 82 opens, or the transistor 65 should short, the constant current regulator 50 will call for such an increase in current as to cause the back bias applied from the positive terminal of the battery 32 through the conductors 16 or 16A to the diodes 210 or 210A to be sufficiently withdrawn depending upon whether transistor 17 or 19 fires first as to permit a diversion of current from the positive terminal of battery 90 through the diode 210 or 210A to in turn effect a change in the voltage applied to the base 118 or 118A of transistor 112 or 112A, as the case may be, so as to trigger the latching action and change of state of the Schmitt trigger 14 or 14A. Thus, in the case of the opening of resistor 80 or the temperature responsive diode 82 or shorting of the current regulating transistor 65, the current will be drawn from the positive terminal of the battery 90 through the Schmitt trigger 14 or 14A, depending upon whether transistor 17 or 19 fires first.

In the event of a short in resistor 28, the voltage at the collector 37A of the transistor 19 will rise and be applied through the conductor 16 to effect a breakdown or avalanche of the Zener diode 212 so as to effect an increase in the voltage at the base 60 of transistors 62 applied through conductor 20 and cause the transistor 62 to start to fire triggering the latching action and the change of state of the Schmitt trigger 14.

Similarly, a short in the resistor 26 will cause the voltage at the collector 37 of the transistor 17 to rise and in turn be applied through the conductor 16A to the Zener diode 212A to cause a breakdown or avalanche of the Zener diode 212A to effect an increase in the voltage applied through the conductor 20A to the base 60A of the transistor 62A to cause the transistor 62A to start to fire triggering the latching action and change of state of the Schmitt trigger 14A.

In the event the transistor 17 or the resistor 44 should open, this would cause the voltage at collector 37 of the transistor 17 to increase and to be applied in turn through the conductor 16A to the Zener diode 212A to cause the Zener diode 212A to avalanche and increase the voltage applied through the couductor 20A to the base 60A of the transistor 62A to cause the transistor 62A to start to fire to in turn effect the latching action and change of state of the Schmitt trigger 14A.

Similarly should the transistor 19 or should the resistor 45 open, this would cause the voltage applied at the collector 37A of the transistor 19 to increase and to be applied in turn through the conductor 16 to cause the Zener diode 212 to avalanche and increase the voltage applied through the conductor 20 to the base 60 of the transistor 62 to cause the transistor 62 to start to fire to effect the latching action or change of state of the Schmitt trigger 14.

Similarly, should the constant current regulator transistor 65 open or should the resistor 72 open, there will be an increase in the voltages applied at the collectors 37 and 37A of the transistors 17 and 19 which will in turn be applied through the conductors 16 and 16A to effect the avalanching of the Zener diodes 212 and 212A to cause the transistors 62 and 62A to fire to trigger the latching action and change the state of the Schmitt triggers 14 and 14A.

Since the Schmitt triggers 14 and 14A are dualized, either change of state in the signal applied to the output conductors 1A or 1B will call for either or both of the filaments 6 and 7 of the light 4 to go on. Furthermore, the manner in which the operative interconnection takes place is novel in that the dual series type Schmitt trigger provided may be triggered from either of the transistors 62 and 112 which make up the series type Schmitt trigger and through the selective operation of the diode 210 and Zener diode 212, the transistors 62 and 112 may be utilized to make the difference amplifier 10 fail-operative.

Normally, both transistors 62 and 112 are open, and in the normal operation when the transistor 62 starts to conduct current, the drop developed across the resistor 98 serves to forward bias the other transistor 112 which then in turn provides regenerative current supplied from the battery 90 through the resistor 96 to the base 60 of the transistor 62 thus causing the change of state and latching of the Schmitt trigger 14.

Further, the diodes 134 and 136 in cooperative relation with the resistors 132 and 59 along with the supply voltage 138 provide temperature compensation for the Schmitt trigger 14 in that the diodes 134 and 136 are formed of a suitable temperature responsive material suitable to compensate for the ambient temperature acting upon the Schmitt trigger.

The Schmitt triggers 14 and 14A are completely independent so that a failure of one Schmitt trigger such as 14 will not deteriorate the operation of the other Schmitt trigger 14A. Similarly, a change in the state of either output 1A of the Schmitt trigger 14 or the output 1B of Schmitt trigger 14A will cause an alarm to cause the "NAND" gate logic circuitry $L_1$ or $L_2$ to cause the filaments 6 or 7 of the indicator light 4 to indicate the first failure condition in the difference amplifier.

In the event of a second difference between the signals being monitored, the remaining Schmitt triggers will fire and latch causing all input ines 1A, 1B, 2A, 2B, 3A and 3B to go low. Thus, two sets of Schmitt triggers go low on the first failure and then upon a second failure, the third set of the Schmitt triggers go low and causes transistor 280 to turn off and transistor 282 to turn on lighting the second failure light 5. In the event of a failure in the Schmitt trigger, any single line going low will cause the failure light to go on because of the dualized system, and also due to the dualized system, as long as one output from each of these three circuits is present, at least one filament 8 or 9 of the second failure light 5 will light. Since the logic in driver circuitry in itself its not fail-operative, it is also dualized. To guard against a failure in the light element, the light filament elements 8 and 9 are dualized.

From the foregoing, it will be seen that there has been provided a triple redundant system capable of fail-operative performance, and by fail-operative, it is understood that the circuit will continue to perform its function or indicate a failure when any one circuit element fails. Further, in the aforenoted arrangement, there is provided a voltage comparator which is completely fail-operative and capable of detecting out-of-tolerance signals, loss of supply voltages, and possessing memory. Failures in the monitor result in a fail-safe condition, that is, either to indicate a monitor or system failure or to continue the operation of the system. The monitoring equipment is offline allowing continued system operation in the event of a monitor failure.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a monitor system of a type including means for receiving a plurality of alternating current input signals, a different amplifier for producing an output as a result of instantaneous differences in the input signals, and said difference amplifier providing said output proportional to the difference between two of said input signals; the improvement comprising a triggering means including a pair of series connected transistors for effecting a change in the operative state of the triggering means, means operatively connecting said output to one of said transistors to effect said change in the operative state of the triggering means upon the output exceeding a threshold value, and means operatively connecting the other of said transistors to said one transistor to latch said one transistor and thereby said pair of transistors and said triggering means in the changed operative state.

2. In a monitor system of a type including means for receiving a plurality of alternating current input signals, a difference amplifier for producing an output as a result of instantaneous differences in the input signals, and said difference amplifier providing said output proportional to the difference between two of said input signals; the improvement comprising a triggering means including a pair of series connected transistors for producing a change in the operative state of the triggering means in response to an input voltage to one of said transistors exceeding a threshold value, means for coupling said output from said difference amplifier to said pair of transistors, said coupling means including first means to effect operation of one of said pair of transistors in response to a first failure condition in the amplifier, and second means to effect operation of another one of said pair of transistors in response to a second failure condition in the amplifier, means responsive to the operation of either one of said pair of transistors producing a change in the operative state of the triggering means for causing the other of said pair of transistors to latch said one transistor and thereby said pair of transistors and said triggering means in the changed operative state.

3. The combination defined by claim 2 in which the first means includes a first control diode, means operatively connecting the first control diode between the difference amplifier and the triggering means to render the first control diode effective upon a first failure condition in the difference amplifier to cause an increase in a biasing voltage acting on said first control diode of said one transistor, and the second means includes a second control diode, and other means operatively connecting the second control diode between the difference amplifier and the triggering means to render the second control diode effective upon a second failure condition in the difference amplifier to cause a decrease in a biasing voltage acting on said second control diode to effect operation through said second control diode of said other transistor.

4. In a monitor system of a type including means for receiving a plurality of alternating current input signals, a difference amplifier including a bridge circuit having a pair of resistor elements connected in opposing arms of the bridge circuit, a pair of current control devices connected in other opposing arms of the bridge circuit, a source of direct current having one terminal connected to said bridge circuit at a point intermediate said resistor elements and an opposite terminal connected at a point intermediate said current control devices, a first output conductor leading from a point in said bridge circuit intermediate one of said resistor elements and control devices, a second output conductor leading from a point in said bridge circuit intermediate another of said resistor elements and control devices, means for applying a pair of the alternating current input signals to said control devices, said bridge circuit being controlled by said devices so as to effect amplified alternating current signals at said first and second output conductors as a result of instantaneous differences in the input signals applied to said control devices, and said differences amplifier providing said output signals proportional to the difference between two of said input signals; the improvement comprising a pair of triggering means, each of said triggering means including a pair of series connected transistors for producing a change in the operative state in the triggering means in response to an input voltage to one of said transistors exceeding a threshold value, means operatively connecting another of said transistors to said one transistor so as to latch said one transistor and thereby said pair of transistors and said triggering means in the changed operative state, first means for coupling said first output conductor to said pair of transistors of one of said triggering means so as to effect operation of one of said pair of transistors upon the alternating current signal exceeding a threshold value and in response to a first failure condition in said one resistor element and control device, said first coupling means effecting operation of another one of said transistors in response to a second failure condition in said other resistor element and control device, the operation of either one of said transistors producing a change in the operative state of the first triggering means and causing the other transistor of said first triggering means to latch said one transistor and thereby said pair of transistors in the changed operative state, second means for coupling said second output conductor to the pair of transistors of said second triggering means so as to effect operation of one of said transistors of said second triggering means upon the alternating current signal exceeding a threshold value and in response to a third failure condition in said other resistor element and control device, said second coupling means effecting operation of another of said transistors in response to a fourth failure condition in said other resistor element and control device, the operation of either one of said transistors of said second triggering means producing a change in the operative state of the second triggering means and causing the other transistors of said second triggering means to latch said one transistor and thereby said pair of transistors and said second triggering means in the changed operative state.

5. The combination defined by claim 8 in which the first coupling means includes a first capacitor, and a first Zener diode connected in parallel to said first capacitor, means operatively connecting the first capacitor and first Zener diode between the first output conductor and the first triggering means so as to render the first capacitor effective to couple the alternating current output signal to the one transistor and the first Zener diode effective upon said first failure condition in said one resistor element and control device causing an increase in the biasing voltage acting on said first Zener diode to effect operation through said first Zener diode of said one transistor of the first triggering means, said first coupling means including a second diode, other means operatively connecting the second diode between the first output conductor and the first triggering means so as to render the second diode effective upon said second failure condition in said one resistor element and control device causing a decrease in the biasing voltage acting on said second diode to effect operation through said second diode of the other transistor of the first triggering means, and the second coupling means including a second capacitor and a third Zener diode connected in parallel to said second capacitor, means operatively connecting the second capacitor and the third Zener diode between the second output conductor and the second triggering means so as to render the second capacitor effective to couple the alternating current output signal to the one transistor of the second triggering means and the third diode effective upon said third failure condition in said other resistor element and control device causing an increase in the biasing voltage acting on said third Zener diode to effect operation through said third Zener diode of said one transistor of the second triggering means, and said second coupling means including a fourth diode, other means operatively connecting the fourth diode between the second output conductor and the second triggering means so as to render the fourth diode effective upon said fourth failure condition in said other resistor element and control device causing a decrease in the biasing voltage acting on said fourth diode to effect operation through said fourth diode of the other transistor of the second triggering means.

6. In a monitor system of a type including an input for receiving a plurality of alternating current signals, a difference amplifier including a bridge circuit for effecting alternating current output signals as a result of instantaneous differences in input signals, and said difference amplifier providing said alternating current output signals proportional to the difference between two of said alternating current input signals; the improvement comprising first and second triggering means, each of said first and second triggering means including a pair of series connected transistors for producing a change in the operative state of the triggering means in response to an input voltage to one of said transistors exceeding a threshold value, means operatively connecting the other of said transistors to said one transistor to latch said one transistor and thereby said pair of transistors in a changed operative state, first means for coupling the alternating current output signals from said difference amplifier to the pair of transistors of said first triggering means, second means for coupling the alternating current output signals from said difference amplifier to said pair of transistors of said second triggering means, and said first and second coupling means including additional means to selectively effect operation of the transistors in said first and second triggering means in response to failure conditions in the amplifier.

7. In a monitor system of a type including an input for receiving a plurality of alternating current signals, a difference amplifier including a bridge circuit for effecting alternating current output signals as a result of instantaneous differences in input signals, and said difference amplifier providing said alternating current output signals proportional to the difference between two of said alternating current input signals; the improvement comprising first and second triggering means, each of said first and second triggering means including a pair of series connected transistors for producing a change in the operative state of the triggering means in response to an input voltage to one of said transistors exceeding a threshold value, means operatively connecting the other of said transistors to said one transistor to latch said one transistor and thereby said pair of transistors in a changed operative state, first means for coupling the alternating current output signals from said difference amplifier to said one transistor of said first triggering means, second means for coupling the alternating current output signals from said difference amplifier to said one transistor of said second triggering means, said first and second coupling means including additional control means to selectively effect operation of one of the transistors in said first and second triggering means upon a failure in an operative part of the bridge circuit of said difference amplifier.

8. In a monitor system of a type including an input for receiving a plurality of alternating current signals, a difference amplifier including a bridge circuit for effecting alternating current output signals as a result of instantaneous differences in input signals, and said difference amplifier providing said alternating current output signals proportional to the difference between two of said alternating current input signals; the improvement comprising first and second triggering means, each of said first and second triggering means including a pair of series connected transistors for producing a change in the operative state of the triggering means in response to an input voltage to one of said transistors exceeding a threshold value, means operatively connecting the other of said transistors to said one transistor to latch said one transistor and thereby said pair of transistors in a changed operative state, first means for coupling the alternating current output signals from said difference amplifier to said one transistor of said first triggering means, second means for coupling the alternating current output signals from said difference amplifier to said one transistor of said second triggering means, and said first and second coupling means including current control means to selectively effect operation of the transistors of said first and second triggering means upon a failure condition in the bridge circuit of the difference amplifier causing a change in a biasing voltage acting on said current control means.

9. In a monitor system of a type including an input for receiving a plurality of alternating current signals, a difference amplifier including a bridge circuit, a direct current voltage source operatively connected for biasing said bridge circuit, means for controlling said bridge circuit in response to said alternating current input signals for effecting alternating current output signals as a result of instantaneous differences in the input signals, and said difference amplifier providing said alternating current output signals proportional to the difference between two of said alternating current input signals; the improvement comprising first and second triggering means, each of said first and second triggering means including a pair of series connected transistors for producing a change in the operative state of the triggering means in response to an input voltage to one of said transistors exceeding a threshold value, means operatively connecting the other of said transistors to said one transistor so as to latch said one transistor and thereby said pair of transistors in a changed operative state, first capacitor means for coupling the alternating current output signals from said difference amplifier to said one transistor of said first triggering means, second capacitor means for coupling the alternating current output signals from said difference amplifier to said one transistor of said second triggering means, a first current control means to operatively connect a pair of arms of the bridge circuit to the first triggering means, a second current control means to operatively connected another pair of arms of the bridge circuit to the second triggering means, each of said first and second current control means including a voltage biased current control diode and a voltage biased Zener diode, one of said diodes being selectively effective upon a decrease and the other of said diodes being selectively effective upon an increase in the biasing voltage acting thereon as upon a failure in an arm of the bridge circuit of said difference amplifier to selectively effect operation of one of the transistors of said first and second triggering means dependent upon the failure in the arm of said bridge circuit.

10. In a monitor system of a type including an input for receiving a plurality of alternating current signals, a difference amplifier including a bridge circuit, a direct current voltage source operatively connected for biasing said bridge circuit, means for controlling said bridge circuit in response to said alternating current input signals for effecting alternating current output signals as a result of instantaneous differences in the input signals, and said difference amplifier providing said alternating current output signals proportional to the difference between two of said alternating current input signals; the improvement comprising first and second triggering means, each of said first and second triggering means including a pair of series connected transistors for producing a change in the operative state of the triggering means in response to an input voltage to one of said transistors exceeding a threshold value, means operatively connecting the other of said transistors to said one transistor so as to latch said one transistor and thereby said pair of transistors and said triggering means in a change operative state, first capacitor means for coupling the alternating current output signals from said difference amplifier to said one transistor of said first triggering means, second capacitor means for coupling the alternating current output signals from said difference amplifier to said one transistor of said second triggering means, and a first electrical current flow control device effective upon a decrease in the biasing voltage acting thereon through the bridge circuit as upon a failure at one part of the bridge circuit of said difference amplifier to selectively effect operation of one of the transistors of said first and second triggering means, a second electrical current flow control device effective upon an increase in the biasing voltage acting thereon through the bridge circuit as upon a failure at another part of the bridge circuit of said difference amplifier to selectively render another of the transistors of said first and second triggering means operative.

References Cited

UNITED STATES PATENTS

| | | |
|---|---|---|
| 3,108,263 | 10/1963 | Sylvander et al. __ 340—248 XR |
| 3,201,773 | 8/1965 | Magee. |
| 3,258,761 | 6/1966 | Krauss _____ 340—248 |
| 3,226,569 | 12/1965 | James _____ 307—88.5 |

OTHER REFERENCES

IBM Technical Disclosure Bulletin vol. 3, No. 6, November 1960, "Voltage Detection Circuit," F. L. O'Malley.

DONALD J. YUSKO, *Primary Examiner.*

U.S. Cl. X.R.

340—248, 172

UNITED STATES PATENT OFFICE
CERTIFICATE OF CORRECTION

Patent No. 3,431,557                                                           March 4, 1969

Frank J. Thomas et al.

It is certified that error appears in the above identified patent and that said Letters Patent are hereby corrected as shown below:

Column 10, line 74, "different" should read -- difference --. Column 11, line 72, "differences" should read -- difference --. Column 12, line 38, the claim reference numeral "8" should read -- 4 --.

Signed and sealed this 7th day of April 1970.

(SEAL)
Attest:

Edward M. Fletcher, Jr.                                   WILLIAM E. SCHUYLER, JR.
Attesting Officer                                                 Commissioner of Patents